United States Patent
Sanchez Expósito et al.

(10) Patent No.: US 8,692,543 B2
(45) Date of Patent: Apr. 8, 2014

(54) AXIS AXIAL POSITION MEASUREMENT SYSTEM

(75) Inventors: José Manuel Sanchez Expósito, Rivas-Vaciamadrid (ES); Francisco Javier Hernandez Rodero, Pozuelo de Alarcón (ES)

(73) Assignee: Industria de Turbo Propulsores, S.A., Zamudia, Vizcaya (ES)

( * ) Notice: Subject to any disclaimer, the term of this patent is extended or adjusted under 35 U.S.C. 154(b) by 148 days.

(21) Appl. No.: 13/319,966

(22) PCT Filed: Apr. 16, 2010

(86) PCT No.: PCT/ES2010/000163
§ 371 (c)(1),
(2), (4) Date: Jan. 31, 2012

(87) PCT Pub. No.: WO2010/130848
PCT Pub. Date: Nov. 18, 2010

(65) Prior Publication Data
US 2012/0119730 A1 May 17, 2012

(30) Foreign Application Priority Data
May 13, 2009 (ES) .................................. 200930165

(51) Int. Cl.
*G01B 7/30* (2006.01)
(52) U.S. Cl.
USPC .................................................. 324/207.25
(58) Field of Classification Search
USPC .................................................. 324/207.25
See application file for complete search history.

(56) References Cited

U.S. PATENT DOCUMENTS

| | | | |
|---|---|---|---|
| 3,115,032 A * | 12/1963 | Northern et al. | 73/660 |
| 3,190,125 A | 6/1965 | Holz | |
| 4,602,515 A * | 7/1986 | Eichenlaub | 73/862.328 |
| 4,833,405 A | 5/1989 | Richards et al. | |
| 5,198,763 A | 3/1993 | Konishi | |
| 6,566,867 B1 * | 5/2003 | Schroeder et al. | 324/207.22 |
| 6,849,979 B2 | 2/2005 | Brunet et al. | |
| 2006/0123909 A1 * | 6/2006 | Rettig et al. | 73/514.39 |

FOREIGN PATENT DOCUMENTS

| | | |
|---|---|---|
| DE | 39 02 809 | 8/1989 |
| DE | 10 2006 045 732 | 4/2008 |
| EP | 1 876 422 | 1/2008 |
| GB | 1 303 994 | 1/1973 |
| GB | 2 181 246 | 4/1987 |

OTHER PUBLICATIONS

International Search Report for International Application No. PCT/ES2010/000163 mailed Aug. 25, 2010.

* cited by examiner

*Primary Examiner* — Bot Ledynh
(74) *Attorney, Agent, or Firm* — Merchant & Gould P.C.

(57) ABSTRACT

Axis axial position measurement system uses the electric signal generated by one or more sensors at the passage of teeth of a cogwheel fixed on the axis. The cogwheel is cut with at least one group of teeth, including at least three types of teeth of different height: a first type of teeth (1) of constant maximum height, a second type of teeth (2) of constant minimum height, and a third type of teeth (3) of variable height in the axial direction of the axis between the maximum and minimum heights of the teeth of the first and second type of teeth.

11 Claims, 4 Drawing Sheets

AXIS AXIAL POSITION MEASUREMENT SYSTEM

This application is a National Stage Application of PCT/ES2010/000163, filed 16 Apr. 2010, which claims benefit of Serial No. P200930165, filed 13 May 2009 in Spain and which application(s) are incorporated herein by reference. To the extent appropriate, a claim of priority is made to each of the above disclosed applications.

FIELD OF THE INVENTION

The present invention refers to an axis axial position measurement system, for example of rotating machines, which is compatible with the measurement of the rotation pattern, from the electric signal generated by one or more sensors, angularly separated, at the passage of the teeth of a cogwheel on said axis.

BACKGROUND OF THE INVENTION

It is known thanks to U.S. Pat. No. 4,833,405 a procedure for measuring the axial position of axes, comprising in its first type the use of two inductive probes in different axial positions and the machining of the cogwheel of the axis following two different angles with respect to the axial direction.

However, this system needs calibration for the correct identification of the axis position.

It also has problems of interaction with the magnetic field between the sensors, which is a problem that must be solved by means of the use of special sensors.

In the same patent a second procedure is described, also based on the use of two probes located in the same axial plane, but slightly separated, combined with the machining of the two opposite sloping ramps in each tooth.

This system enables to measure the axial displacement of the axis by the relation of the signal amplitude generated by each sensor, which will be function of the air gap between said sensor and the machined tooth. According to the axial position of the axis a sensor will generate more tension and the other less or vice versa.

As two sensors are needed in this system in order to compare the signal, calibration is needed in order to identify the exact position of the axis, since any tolerance in the sensor positioning (more or less mounting depth) directly implies an axial position error which can only be corrected through calibration.

Likewise, sensor manufacturing tolerances (field intensity, dimensions, etc,) imply a direct error in the measurement which can only be corrected through calibration.

Due to the unavoidable aging of the sensor elements, a difference in their response can be expected as time passes, which will require periodic calibration.

The carrying out of a calibration supposes a continuous and controlled rotation of the axis (in order to obtain a measurement signal) and a controlled axial displacement and measurement thereof, which is a situation that is hard to solve in applications such as aeronautics where once the axis is mounted it is expected to separate as much as possible the engine intervention intervals, and carrying out the calibration in a real work environment has serious limitations as it is necessary to measure with respect to a pattern and to carry out the entire displacement path.

Besides, any movement that implies a rotation which does not coincide with the theoretical axis will entail an error in the measurement as each sensor is in a different axial plane. This effect can be produced for example by a bending of the axis which causes that the centre thereof and the rotation centre do not coincide in all its length.

Another of the advantages of this system is that it needs a machined axis length of at least twice the maximum axial displacement to be measured, since said displacement must be measured by both probes located in different axial planes.

This system enables the measurement of the axis rotation speed with the necessary resolution in applications where the maximum pulses per turn are necessary.

Thanks to U.S. Pat. No. 5,198,763 it is known another procedure to measure the axial position of axes based on the time difference between the signal generated by machined teeth in the axis, one in the axial direction and another with a variable rotation with the axial position.

However, this system lacks the necessary amount of pulses per turn for an application where the answer vis-à-vis variations in the rotation speed is fundamental, and two pulses, unsynchronized, per turn entails a significant delay in detecting these variations.

On the other hand, this system complicates the usually simple and necessarily robust rotation pattern measurement system, as it has two pulses per turn the offset of which varies with the axial position.

U.S. Pat. No. 5,198,763 describes a procedure for measuring the axial position of axes, but this procedure requires the use of specific sensors for its functioning, which are very different from traditional inductive sensors used for measuring the rotation pattern.

This measuring procedure requires the use of eight sensors for its operation.

Thus, the axis length used for measuring is at least twice the average maximum displacement.

British patent No. 1,303,994 describes a procedure for measuring the axial position of axes, which requires the installation of a magnetic element in the rotation axis and wiring of particular characteristics in the stator.

This procedure generates a pulse per turn which is not enough for rotation pattern measuring systems requiring a fast response vis-à-vis speed variations.

This procedure is substantially different from the usual way of measuring the pattern using a cogwheel, usually having 60 teeth, in which case it is called trigger wheel.

British patent No. 2,181,246[a] describes a procedure for measuring the axial position of axes, which requires the installation of a magnetic element in the rotation axis and wiring of particular characteristics in the stator.

This procedure generates a pulse per turn which is not enough for rotation pattern measuring systems requiring a fast response vis-à-vis speed variations.

This system generates three pulses per turn with offsets proportional to the axial position, which complicates any pattern measuring system and makes the second and third pulse useless for measuring the rotation pattern.

This procedure is substantially different from the usual way of measuring the pattern using a cogwheel and, as such, it cannot be considered a compatible fast response pattern measurement system.

U.S. Pat. No. 3,190,125 describes a procedure for measuring the axial position of axes using the time difference between two pulses to determine the axial position.

This procedure requires such grounding of the rotating axis and of the measuring probe at a constant potential, and due to the variation of the capacitive effect due at the passage of the metal blades in front of the sensor elements there are obtained signal pulses the delay of which is proportional to the axial position.

This procedure generates a valid pulse per turn which is not enough for rotation pattern measuring systems requiring a fast response vis-à-vis speed variations. Since the second pulse is offset according to the axial position and it is not possible to use it for the pattern measurement. This is a system exclusively oriented towards measuring the axial position.

SUMMARY OF THE INVENTION

The object of the present invention is an axis axial position measurement system, from the electric signals generated by one or more sensors, at the passage of teeth of a cogwheel which, maintaining a mechanical and electric configuration corresponding to the one used for the measurement of a rotation pattern, such as the one which can be used in an aeronautic turbine, enables in a compatible manner both the measurement of the axial position of the axis and the rotation speed thereof, and all of which with a response speed both in speed and in position according to the needs of this type of applications.

Additionally, the present invention adds the use of traditional inductive sensors and the possibility of performing the measuring with only one sensor.

Another advantage of this invention is the incorporation of the self-calibration in the measurement system, so that the measurement of the axial position is independent from tolerances of the sensors and its degradation with time, from the tolerances of its positioning during mounting and from any effect of radial relative displacement between the axis and the stator where the sensor(s) is/are located.

The present invention allows the measurement of the relative axial position of the axis with respect to the stator where the sensor(s) is/are located.

The system of the invention requires an axis length equivalent to the maximum displacement which is to be measured.

With the system of the invention only the tolerances of the axis machining, and more specifically, the relative tolerances between adjacent teeth are the only source of uncertainty of the system comprising the axis, the stator and the sensor(s).

The system of the invention can be applied, for example, to the detection of turbine axes, as it measures in a faster way the axial displacement of the turbine group at the end of the axis.

Likewise, the system of the invention enables the detection of the uncontrolled acceleration of the turbine axis, as it measures the axial displacement before there is a speed increase. It can also be applied to the identification of the inversion point of the axial load of the ball bearing in the axes of aeronautic turbines.

According to the invention, the cogwheel is cut with one or more equal groups of teeth, each group comprising at least three types of teeth of different height, a first type of teeth of constant maximum height, a second type of teeth of constant minimum height, and a third type of teeth of variable height in the axial direction of the axis, between the maximum and minimum heights of the teeth of the first and second type of teeth mentioned above. The teeth of variable height generate, through the sensor or sensors, a signal whose amplitude is a function of the axial position of the variable height teeth, with respect to the sensor or sensors, and is delimited by the amplitudes of the signals generated by the maximum and minimum height teeth.

The cogwheel can also be cut with one or more types of teeth of constant height, comprised between the maximum and minimum height of the first and second types of teeth mentioned above.

Each type of teeth can comprise only one tooth or at least the third type of teeth of variable height can comprise more than one tooth, arranged in alternate positions with the maximum and minimum height teeth.

Each type of teeth can also comprise at least two teeth of each different height, each group of teeth of the same type located in consecutive positions, alternating with the positions of the teeth of the other types.

Each group of teeth can include at least one type of teeth with more than a tooth, being it possible for each group of teeth to include more than one type of teeth of variable height, in which the inclination variation can be in the same direction or in different directions.

According to another embodiment variant, each group of teeth can include more than one type of teeth of variable height, in which their inclination runs in a different direction.

In this way, the invention takes advantage of the distribution of a series of teeth of different heights arranged in a consecutive manner on a traditional cogwheel, to obtain the axial position of the axis on which it is mounted, so that the measurement has self-calibration in real time.

With the system of the invention the axial position of the axis is determined by the relation of the voltage obtained in the tooth of variable height, with respect to the voltages obtained in the teeth of maximum and minimum height.

Also, according to the invention, in each group of teeth, the teeth of constant height generate a reference signal which is used as a self-calibration method.

BRIEF DESCRIPTION OF THE DRAWINGS

The attached drawings show a schematic non-limiting example of a possible embodiment of the axis axial position measurement system of the invention.

In the drawings.

DETAILED DESCRIPTION OF AN EMBODIMENT

The rotation pattern measurement system, especially in aeronautic turbines, is formed by a cogwheel normally located at the end of the axis and by one or more inductive sensors which generate an electric signal with an amplitude inversely proportional to the space between the sensor and the upper part of the teeth, and with a frequency proportional to the rotation regime and to the number of teeth of the cogwheel.

With the present invention it is possible, through the machining of some of the teeth of the cogwheel, to have a measure proportional to the axial position of the axis in a self-calibrated manner.

According to the present invention, the cogwheel is cut with equal groups of teeth of different height, which consecutively repeat in the entire contour thereof.

Figure 1:
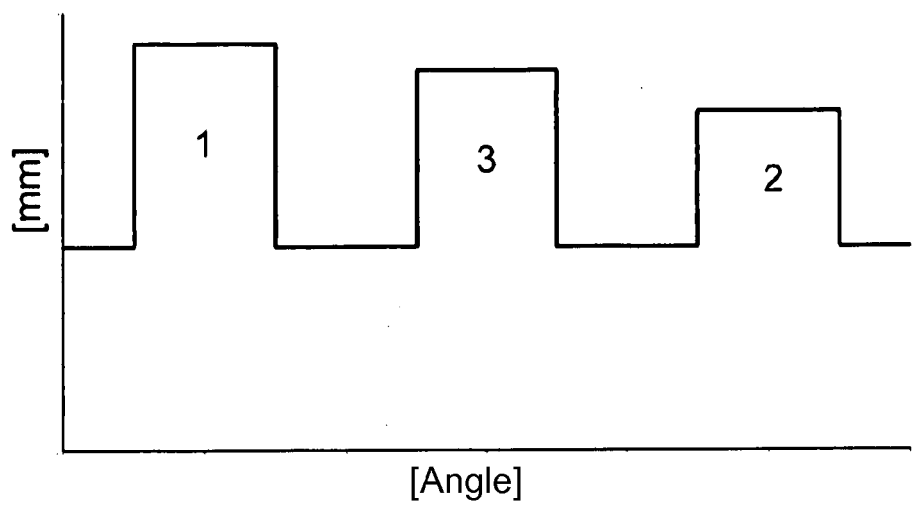
FIG. 1 shows the development of a group of teeth which, according to the invention, repeat consecutively in all the contour of the cogwheel used for the measurement of the axial position of an axis.
Figure 2:
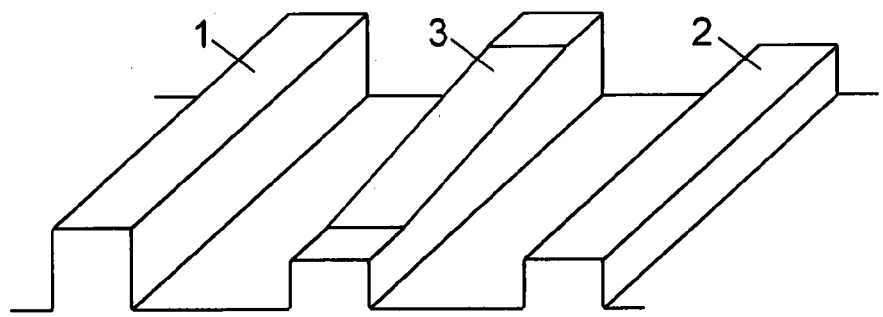
FIG. 2 shows a perspective view of the development of the same group of teeth.

FIGS. 1 and 2 represent a group of teeth which repeat consecutively in all the contour of the cogwheel and which comprise three types of teeth of different height, where in the example represented each type of teeth has only one tooth, a tooth which is indicated by reference number 1 and which is of maximum height, a tooth 2 of minimum height and an intermediate tooth 3 of variable height, in axial direction of the axis, this variation being comprised between the height of the teeth 1 and 2, of maximum and minimum height.

Figure 3:
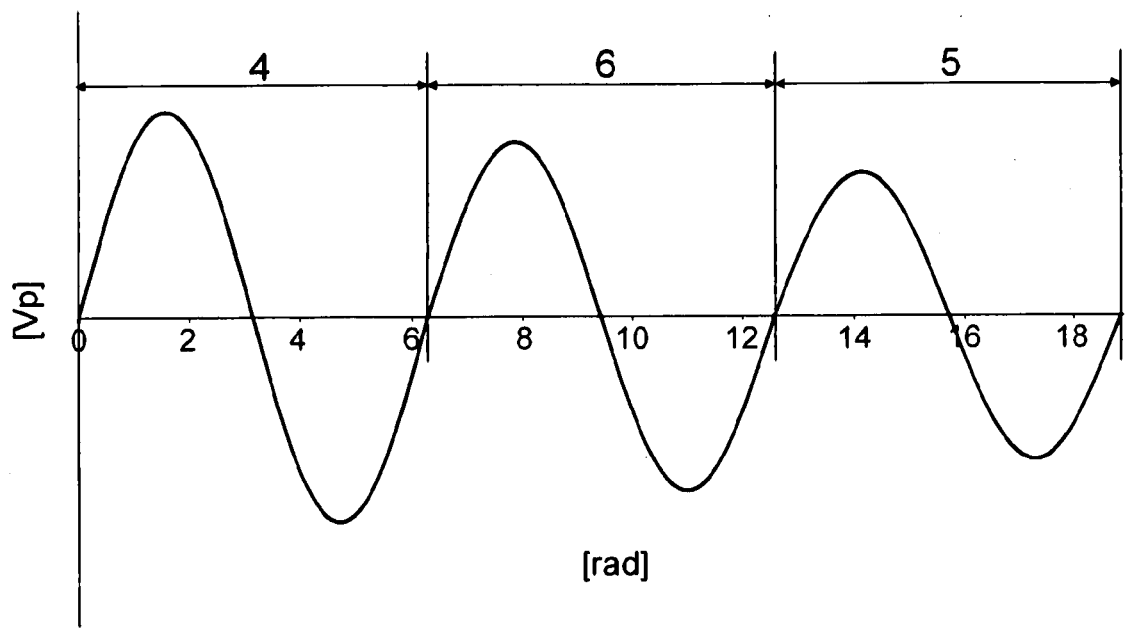
FIG. 3 shows a representation of the tension obtained with the group of teeth of FIGS. 1 and 2.

Using the tooth sequence of FIGS. 1 and 2, arranged in a repetitive manner on the entire curved surface of an axis, in combination with a fixed inductive sensor, radially located with respect to the axis at a certain distance thereto, a tension will be obtained which will present a form according to FIG. 3, in which the voltage is represented in ordinates and the angle in radials is represented in abscissas, the section 4 corresponding to tooth 1 of maximum height, section 5 to the tooth 2 of minimum height and the section 6 to the tooth 3 of variable height.

In the system of axes of FIG. 1, the height of the teeth in millimeters is represented in ordinates and the angle occupied by the teeth is represented in abscissas.

The present invention takes advantage of the distribution of a series of teeth of different heights arranged in a consecutive manner on a traditional cogwheel, to obtain the axial position of the axis on which it is mounted, so that the measurement has self-calibration in real time.

As shown in FIGS. 1 and 2, with a sequence of three teeth, so that the first 1 has a maximum height, the third 2 has a minimum height and the intermediate one 3 has a ramp axially arranged so that its maximum height coincides with the height of the first tooth 1 and its minimum height coincides with that of the third tooth 2, with the use of an inductive sensor it is possible to determine the axial position of said axis, based on the amplitude of the tension induced by the passage of the second tooth in relation to the maximum tension of the first and minimum tension of the third.

At all times the signal generated by the tooth 1 will be that of greater amplitude and the one generated by tooth 2 will be that of smallest amplitude. The amplitude of the signal generated by the tooth 3 will have an amplitude comprised between the two previous ones.

Figure 4:
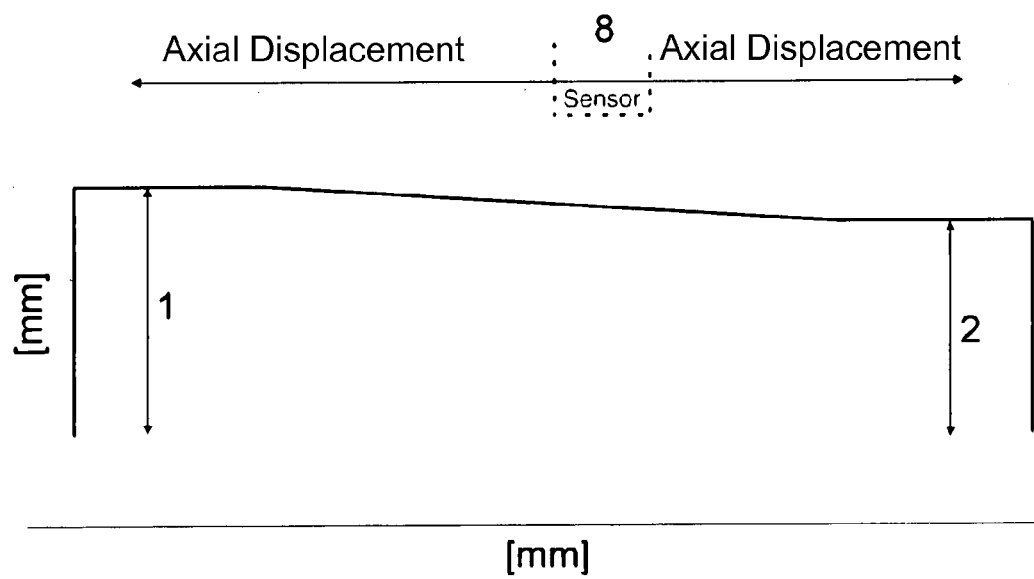
FIG. 4 shows a variation of the height of the intermediate axis of the group of teeth of FIGS. 1 and 2, from the axial point of view of the axis.

From the axial point of view, the teeth 1 and 2 present a uniform and constant height, and teeth 3 present a ramp, as shown in FIG. 4, where the height of the teeth is represented in ordinates and the length thereof is represented in abscissas, all of that in millimeters. Reference 8 indicates the position of the sensor.

This form of the teeth 3, machined with maximum heights equivalent to the teeth 1 and minimum heights equivalent to the teeth 2, enables to conclude that the signal amplitude generated by the teeth 3, is always limited in its upper part by the one generated by the preceding type 1 teeth and in its lower limit by the following type 2 tooth. Through this mechanical system it is possible to delimit the signal generated by a sensor at the passage of said tooth sequence.

Figure 5:
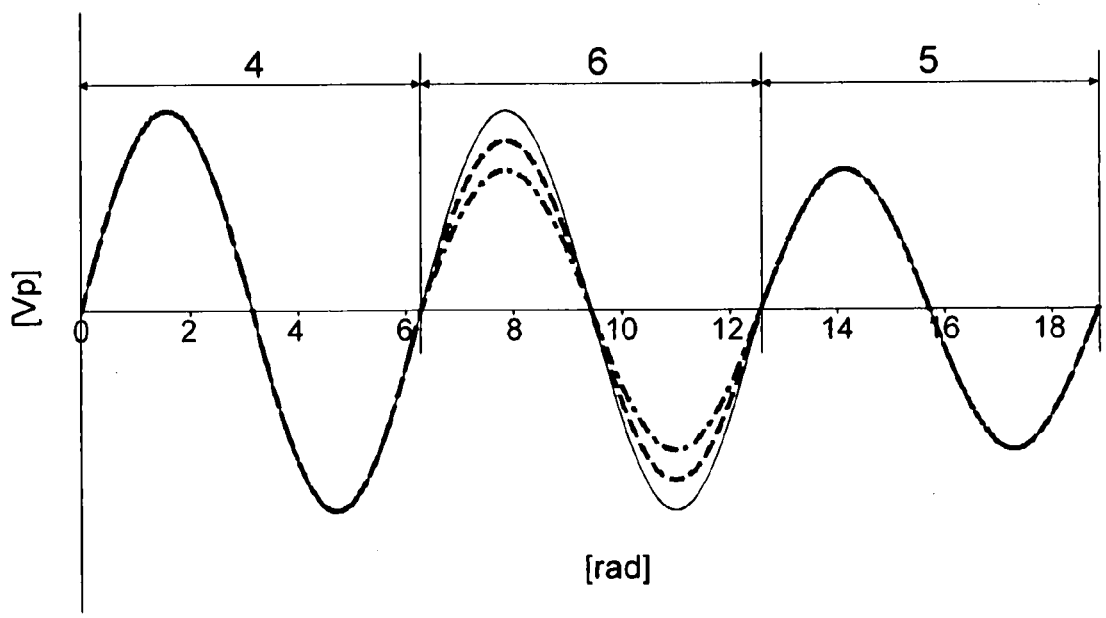
FIG. 5 shows the tension generated by the teeth of variable height, which will be a function of the axial position of the axis.

The tension generated by the teeth 3 will be a function of the axial position of the axis, so that when due to the axial movement of the axis the sensor faces higher parts of the type 3 teeth, the amplitude of the signal generated will be greater, and in the same way when the sensor faces lower parts of type 3 teeth, the amplitude of the signal generated will be smaller, and at all times this amplitude will be delimited by the amplitudes of the signals generated by the adjacent teeth. FIG. 5 shows this description, the voltage being represented in ordinates and angles in radiants represented in abscissas.

Once the elevations of the amplitude of the signal generated by the teeth 3 are demonstrated, it can be concluded that there exists a direct relation between the amplitude of the signal represented by the teeth 3 and its axial position.

This sequence of machined teeth 1 and 2 with the maximum and minimum heights of the tooth 3 ramps enables to generate an implicit self-calibration signal in the same measurement.

This self-calibration signal enables to avoid the need of any initial or later calibration to be able to know the state of the measurement or of the sensor. Any substitution of the sensor by another equivalent one, any modification of the gap between the sensor and the axis, any damage of the characteristics of the sensor are eliminated as there are two reference measurements inserted in the same measurement.

Likewise, the mechanical deformations that affect the relative position between the axis and the sensor are eliminated as there are two measurements corresponding to the maximum and minimum values of the parameter to be measured.

Each type of teeth can comprise two or more teeth of each different height, each group of teeth having teeth of the same type located in consecutive positions, alternating with the positions of the teeth of the other types.

At least the third type of teeth at a variable height can comprise more than one tooth, which will be arranged in positions alternating with the maximum and minimum height teeth.

In order to obtain the maximum of measurement of the axial position for each turn, it is possible to change the sequence of teeth set forth so far: 1, 3, 2, 1, 3, 2, 1, 3, 2 . . . , for another one such as: 1, 3, 2, 3, 1, 3, 2, 3, 1 . . . , this sequence enables to carry out more measurements for the same number of teeth per turn, since in the first measurement the sequence 1, 3, 2 is used and in the second one the last tooth of the previous measurement is used 2, 3, 1 and so on and so forth. This new sequence of teeth enables to carry out 30 measurements per turn in case of using the traditional trigger wheel, instead of the 20 measurements per turn of the first proposal.

Due to the fact that the diameter of the sensor head of the inductive sensor is frequently bigger than the tooth width, side effects can be expected due to the previous tooth in the amplitude of the signal generated by the current tooth, which could affect the amplitudes of the reference signals, teeth 1 and 2, according to the axis position. In order to mitigate this effect it is possible to use a sequence of teeth which enables that at all times the sensor is seeing an environment of similar characteristics.

This sequence can be represented as 1, 1, 1, 3, 3, 3, 2, 2, 2, 3, 3, 3, 1, 1, 1, 3, 3, 3, 2, 2, 2, . . . , so that it can always be assured that the intermediate tooth of each block of three will generate a signal not affected by different teeth in its environment. This sequence enables to carry out 10 measurements of axial position by revolution with only one sensor.

These and other sequences will be possible as long as in the set of teeth of the cogwheel there exists a set of at least three teeth, one of minimum height, another of maximum height and a third one of variable height between the heights of the teeth of maximum and minimum height, arranged between them in any order and number.

The determination of the value of the axial position of the axis is given by the relation of the voltage obtained in the measurement tooth (V3) with respect to the maximum voltage of the tooth 1, (V1) and minimum voltage of the tooth 2, (V2).

As it can be seen in FIG. 6, where the axial position in millimeters is represented in ordinates and the voltage in abscissas, in first approximation the axis position will be given by the lineal relation between the end positions of the axis and their corresponding voltages. In this case, it has been used the tension generated by the second tooth of each sequence of three.

Since the flow in the space between the sensor and the cogwheel is an inverse function of the distance, the tension obtained will not be lineal with respect to the variations of said space. On the other hand, the relations between the tensions V1 and V2 is directly related to the resolution and precision of the measurement. As the small differences between both tensions will imply a greater sensibility to noise, however great differences will imply working in the non-linear area of the curve of FIG. 7, where the voltage is represented by ordinates and the distance in millimeters is represented by abscissas.

The selection of a voltage relation between V1 and V2 which enables a measurement suitable to the application will imply the variation value of the hole between the sensor and the cogwheel, and therefore, the height of each type of tooth.

Anyway, when there are small variations of this separation it is possible to carry out a linear approximation of the curve with errors lower than 1%.

Figure 6:
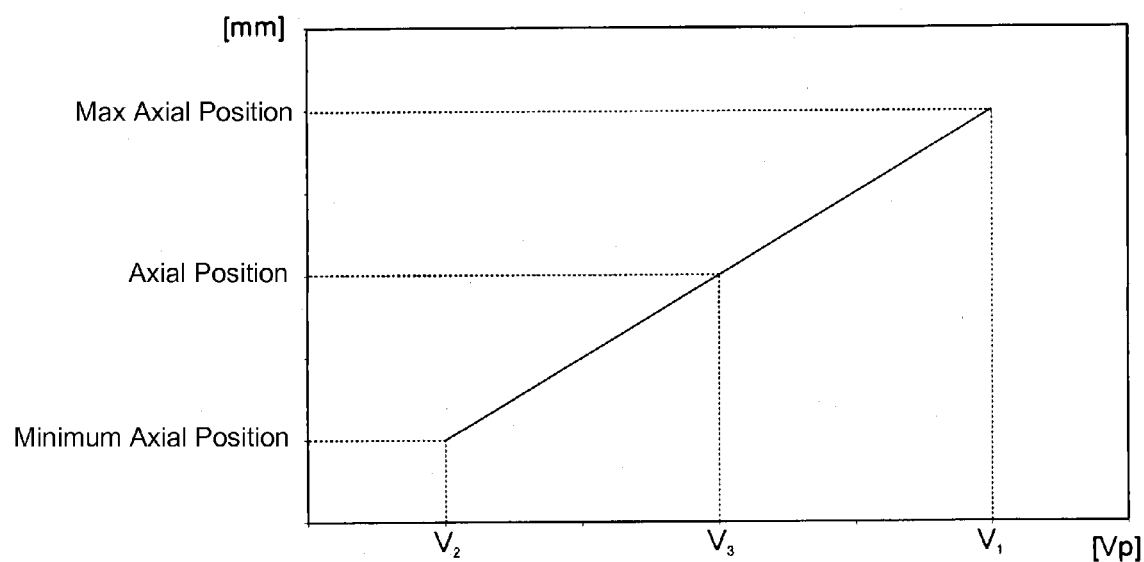
FIG. 6 represents the determination of the value of the axial position of the axis according to the relation of the voltage obtained from the different teeth, of the group of teeth represented in FIGS. 1 and 2.

The fluctuations and variations of the central position of the axis and the relative variations between the axis and the casing where it is housed will entail a displacement of the operating range on the curve of FIG. 6. In this way, there exists a risk, for example, that due to an incorrect positioning of the probe with respect to the cogwheel, the operation is carried out in the area of greater curvature of FIG. 7, which implies a greater linearity error in the measurement. This risk can be mitigated by a more evolved method to calculate the position from the voltage measured.

Figure 7:
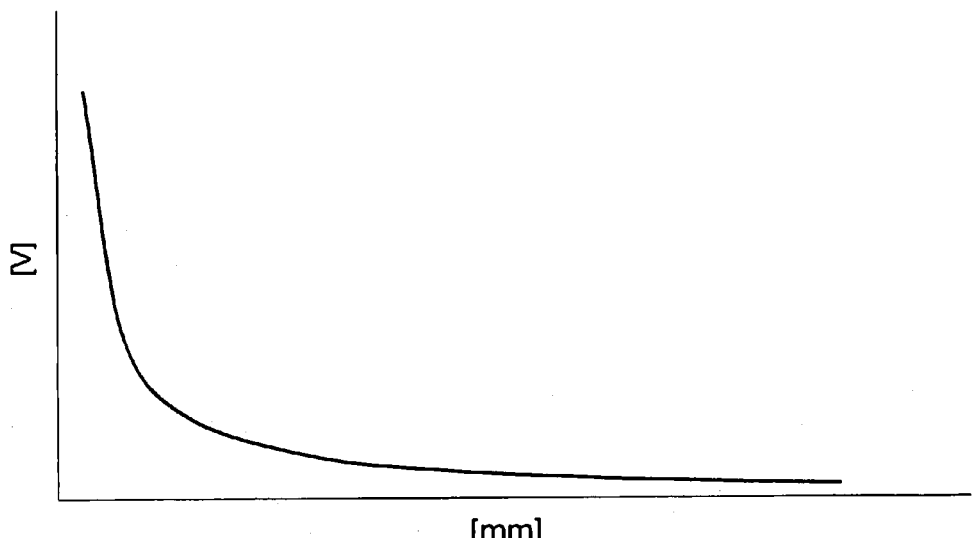
FIG. 7 represents a curve of the tension obtained by the sensor.

As at all times it is possible to obtain a relation between maximum tension of the teeth 1, of the minimum tension of the teeth 2 and the rotation pattern, and as the curve of FIG. 7 can be obtained in a non-dimensional manner, since the shape only depends on the inverse of the distance, it is possible to be inside the curve and know if we are in a linear area or not, and therefore extract the value of the position in a lineal manner or applying the dimensional curve of FIG. 7.

Figure 8:
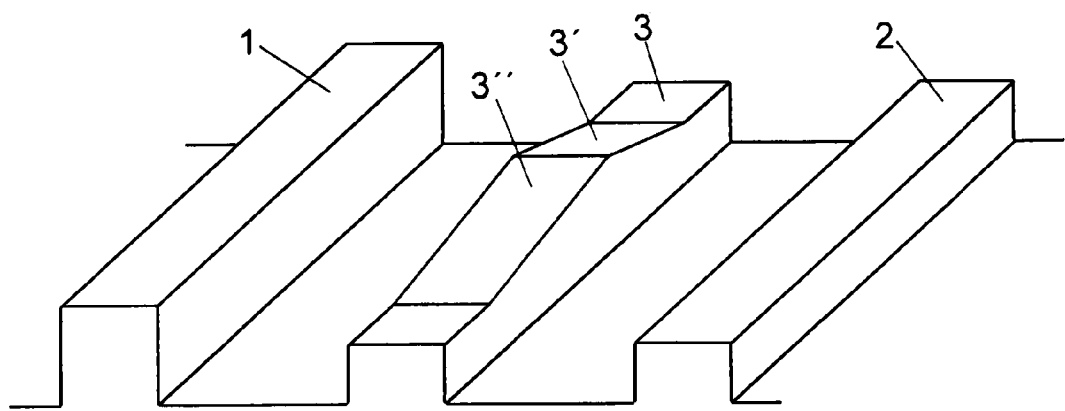
FIG. 8 is a similar view of FIG. 2, showing a first embodiment variant.

FIG. 8 shows a group of teeth, similar to that of FIG. 2, in which the tooth 3 of variable height has an inclination variation in two different directions 3' and 3", determining a convex configuration.

Figure 9:
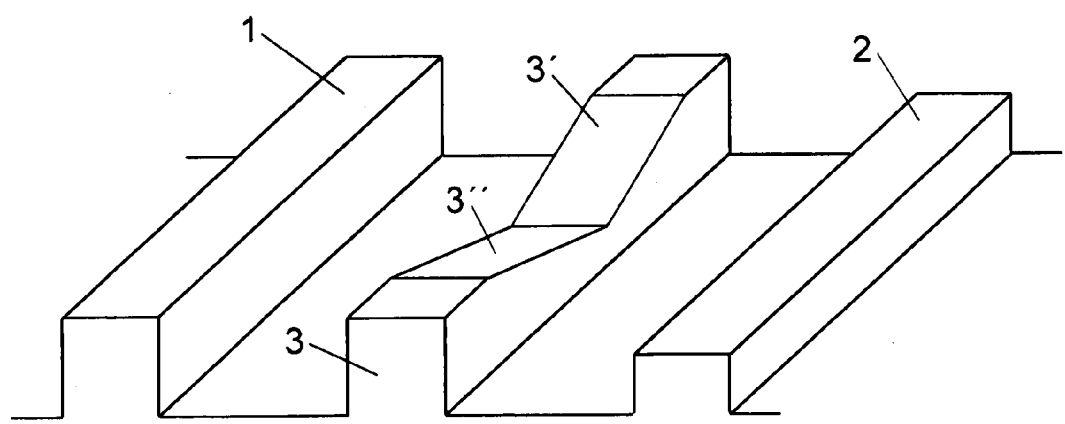
FIG. 9 is a similar view of FIG. 2, showing a second embodiment variant.

In FIG. 9, the tooth 3 also has sections 3' y 3" with different inclination, but determining a concave configuration.

As it can be derived, the invention provides a system to measure the axial position of an axis on the basis of a traditional measurement system of the rotation pattern and with the use of a traditional inductive probe, as it incorporates a self-calibration system and reference inside the same measurement. The invention enables the coexistence of a system to measure the rotation pattern of the axis with the ability to respond fast at speed variations, generating multiple pulses per turn, with the measurement of the axial position of the axis, without both measurements interfering with each other.

Besides, the invention enables the carrying out of a system to measure the axial position of an axis in a compact manner, as it is needed as axial distance only the same value as the axial displacement that is to be measured.

The invention claimed is:

1. Axis axial position measurement system, from an electric signal generated by one or more sensors, radially separated from the axis, at the passage of teeth of a cogwheel fixed on said axis, the cogwheel is cut with one or more equal groups of teeth, each group comprising at least three types of teeth of different height, a first type of teeth of constant maximum height, a second type of teeth of constant minimum height, and a third type of teeth of variable height in the axial direction of the axis, between maximum and minimum heights of the teeth of the first and second type of teeth; variable height teeth generate, through the sensor or sensors, a signal which amplitude is a function of the axial position of the variable height teeth, with respect to the sensor or sensors, and is delimited by the amplitudes of the signals generated by the maximum and minimum height teeth.

2. System according to claim 1, wherein the cogwheel is also cut with one or more types of teeth of constant height, comprising between the maximum and minimum height of the first and second types of teeth.

3. System according to claim 1, wherein each type of teeth comprises a single tooth.

4. System according to claim 1, wherein at least the third type of teeth of variable height comprises more than one tooth, arranged in alternate positions with the maximum and minimum height teeth.

5. System according to claim 1, wherein each type of teeth comprises at least two teeth of each different height, each group of teeth of the same type located in consecutive positions, alternating with the positions of the teeth of the other types.

6. System according to claim 1, wherein each group of teeth includes at least one type of teeth with more than one tooth.

7. System according to claim 1, wherein each group of teeth includes more than one type of teeth of variable height, all of the teeth of variable height having inclination variation in the same direction.

8. System according to claim 1, wherein each group of teeth also includes more than one type of teeth of variable height, with inclination variation in the same direction in a different direction.

9. System according to claim 1, wherein at least one of the third type teeth of variable height has inclinations in different directions.

10. System according to claim 1, wherein the axial position of the axis is determined by the relation of a voltage obtained in the tooth or teeth of variable height, with respect to voltages obtained in the teeth of maximum and minimum height.

11. System according to claim 1, wherein in each group of teeth, the teeth of constant height generate a reference signal which is used as a self-calibration method.

* * * * *